United States Patent Office 3,833,528
Patented Sept. 3, 1974

3,833,528
BITUMINOUS COMPOSITION
Rolf-Dieter Behling and Manfred Wolfgang Oelsner, Hamburg, and Erich Gunther Zenke, Halstenbek, Germany, assignors to The British Petroleum Company Limited, London, England
No Drawing. Filed Mar. 1, 1972, Ser. No. 231,023
Claims priority, application Germany, Mar. 17, 1971, P 21 12 773.1
Int. Cl. C08f 45/28, 45/52
U.S. Cl. 260—28.5 AS
12 Claims

ABSTRACT OF THE DISCLOSURE

Bitumen, flux oil and 5–25% by weight of EPT rubber are blown to form a concentrate which is then blended with unblown bitumen to form a paving grade material.

This invention relates to a process for the preparation of a bituminous composition, in particular, a bituminous composition suitable for use as a paving grade bitumen.

The terms "bituminous composition," "bituminous substance" and "bitumen," as used in the specification, shall be understood to have the meaning "asphaltic composition," "asphaltic substance" and "asphalt," respectively, in accordance with the definition ASTMD8–55 established for "asphalt" by the American Society for Testing Materials.

In bituminous roads, the top layer is stressed to the greatest extent because it is directly exposed to the full traffic load whereas lesser pressures are exerted on the deeper layers because of the load distributing effect. Moreover, the unprotected upper layer is most affected by temperature since extreme summer and winter temperatures are encountered here. Thermally dependent tensile and compressive stresses of the daily change in temperature are most marked here, too. Furthermore, wear stresses caused by moving traffic are most marked in the bituminous surface. Similar but lower stresses affect the layers immediately beneath the top layer.

The above mentioned stresses of the upper bituminous layers must be largely absorbed by the binder of the asphalt mix. Due to the thermoplastic character of conventional bituminous binders, stresses are most critical at low temperatures, high axle loads, high traffic frequencies and high traffic speeds.

For highly stressed asphalt roads, in particular for top surfaces under critical climatic and/or traffic conditions, a modified bituminous binder is therefore desired which shows low embrittlement at low temperatures and flexible behaviour under dynamic loads over a broad temperature range. To ensure processibility under conditions usually encountered in asphalt mixing plants, the high temperature viscosity characteristics of such modified binders must be comparable with those of conventional commercial binders, i.e., they should possess approximately the same viscosity at processing temperatures.

It is known that bituminous binders with improved elastic properties can be obtained by adding natural rubber; however, the thermal stability of such mixtures is not sufficient to ensure that the full elastic properties of the modified binders are obtained under temperatures encountered during hot tank storage of the binders and during the hot mixing process in the asphalt mixing plant. It has also been proposed on many occasions to add synthetic elastomers to bituminous binders. The resulting compositions suffer from the same defects and, in addition, it is also possible for the bitumen and rubber to separate during hot storage.

It is also known that improved flexibility and lesser temperature susceptibility of paving bitumen consistency can be obtained by increasing the bitumen gel structure by oxidation with air, which results in an increase in the penetration index. However, only a comparatively low elasticity is thus obtained even if the blowing time is prolonged. If this is done, however, the cohesive properties of the bitumen are impaired. Low temperature ductility, and adhesion to critical minerals and miscibility with other binders are reduced.

We have recently discovered that bitumen extended by a suitable flux oil and blended with certain elastomers can be blown so that a homogeneous product of improved elasticity and hot storage stability results, without degrading the elastomer. This forms the basis of our copending British Patent Application No. 42,608/70 (BP Case HAM 2800) which corresponds to copending U.S. Patent Application Ser. No. 71,196.

The compositions prepared according to Application No. 42,608/70 are homogeneous and even when they are stored hot, little or no separation of the components takes place. They have marked elastic properties and are particularly suitable for use as sealing materials, pipe wrapping impregnating compounds and pipe lining compounds, for the production of bitumen paints, and insulating materials for the electrical engineering industry, for the production of elastic roofing felt and water proofing felt, and for heat and sound insulating materials.

Attempts to prepare less expensive elastified paving grade bitumens of lower rubber content by the process of 42,608/70 have not been successful. As the elastomer content decreases so the required blowing time increases. The saving in material costs is outweighed by the increase in processing costs.

We have surprisingly discovered that some of the products of the process disclosed in Application No. 42,608/70 can be blended with unblown bitumen to provide a homogeneous hot storage stable elastified bitumen suitable for use as a paving grade bitumen. Such products suitable for blending are subsequently referred to in this specification as concentrates.

Concentrates which are suitable are those which have been blown for a sufficient length of time to impart and retain homogeneity to subsequent blends of the concentrate and unblown bitumen. The blowing time depends on the type of the bitumen, the nature of the flux oil and the ratio of the components. In any specific instance, however, the appropriate blowing time is easily determined by simple laboratory tests. If after blending the concentrate with unblown bitumen the resulting composition is heterogeneous or tends to separate then the blowing time has been insufficient. The various parameters may be adjusted as explained above to obtain a satisfactory blowing time in any given situation. In general a blowing time of at least 5 hours is necessary.

According to the present invention there is provided a process for the production of a bituminous composition, suitable for use as a paving grade bitumen, in which a mixture of:

10–85% wt., based on the total mixture, of a bituminous substance,
5–25% wt., based on the total mixture, of a copolymer of one or more mono alpha olefins and a cyclic olefin having an endocyclic bridge and at least two olefinic double bonds,
10–85% wt., based on the total mixture, of an aromatic flux oil, and
0–4 parts by weight sulphur per 100 parts polymer, is blown at
150°–260° C. with a gas which contains elemental oxygen to form a concentrate, and the concentrate is blended with unblown bitumen.

The bitumen is preferably a vacuum residue derived from a Venezuelan or Middle East crude oil.

Preferably the copolymer contains units derived from both ethylene and propylene. The preferred cyclic olefin is dicyclopentadiene.

The feedstock for blowing preferably contains 5–15% wt. of the copolymer, most preferably 10–12%.

The aromatic flux oils most suitable for use in the process according to the invention are those known in the petroleum industry as "aromatic extracts." These are the fractions produced by treating vacuum distillates and de-asphalted vacuum residues with solvents selected for the aromatic components. The solvents commonly used include furfural, sulphur dioxide and phenol.

Aromatic extracts obtained during the production of lubricating oils are particularly suitable.

Suitably 10–50 parts concentrate, preferably 25 parts are dissolved in 100 parts bitumen.

The aromatic flux oil is suitably incorporated into the copolymer by milling at a temperature in the range 90° to 150° C., preferably about 100° C., and the mixture added to the molten bitumen in the blowing apparatus.

Preferably the blowing of the concentrate is carried out in two stages. The first stage (initial blowing) is preferably carried out at 180° to 230° C. and the second stage is carried out at 230° to 250° C. The initial blowing is particularly advisable if the bituminous substance tends to oxidise rapidly.

The blowing time will usually be in the range 8 to 20 hours.

When sulphur is employed, further improvements in elasticity and homogeneity are achieved.

When sulphur is used it may be added before, during or after the blowing. Suitable concentrations of the sulphur are 0.5–4 parts per wt. of sulphur to 100 parts by wt. of the copolymer.

The concentrate is suitably incorporated into the unblown bitumen by agitation at a temperature in the range 170° to 200° C.

The invention is illustrated by the following Examples.

EXAMPLES

Table 1 gives composition of feedstock, blowing times and inspection data on the concentrates for three examples.

TABLE 1

| Example | 1 | 2 | 3 |
|---|---|---|---|
| Feedstock: | | | |
| Elastomer, percent by wt | 10 | 10 | 10 |
| Aromatic flux oil, percent by wt | 30 | 30 | 30 |
| Bitumen B 200, percent by wt | 60 | 60 | 60 |
| Sulphur, parts per 100 parts elastomer | 2 | 1 | -- |
| Blowing temperature, ° C | [1]230–[2]240 | 240 | 240 |
| Blowing time, hrs | [1]5–[2]7 | 15 | 20 |
| Air flow rate, m.³/hr. kg | ca. 0.4 | ca. 0.4 | ca. 0.4 |
| Blown concentrate: | | | |
| Softening point ring and ball, ° C | 67 | 93 | 102 |
| Penetration, 25° C. mm./10 | 100 | 65 | 42 |

[1] First stage.
[2] Second stage.

The bitumen was derived from a Tia Juana crude oil. It has a penetration of 185 mm./10 and a softening point of 41° C.

The solubility properties of the concentrates were tested by blending with unblown bitumen at hourly intervals from the commencement of blowing, until the achievement of complete homogeneity when viewed under a microscope.

20 parts of each blown product were then separately dissolved in 80 parts bitumen at 200° C. by stirring. In each case a homogeneous product containing 25% by weight of elastomer was obtained.

The elastomer was a terpolymer of ethylene, propylene and dicyclopentadiene which had a Mooney viscosity of 70.

The aromatic flux oil was obtained by furfural extraction of lubricating oil base stock intermediates. It has a viscosity E/50° C. of 75.

Both Examples 1 and 2 illustrate the behaviour of concentrates containing sulphur. In Example 1, which employed 2 parts sulphur per 100 parts copolymer, the total blowing time required to produce a homogeneous blended product was 12 hours. In Example 2, which employed 1 part per 100 parts elastomer and was otherwise identical, the required blowing time was 15 hours.

Examples 3 illustrates the behaviour of similar concentrates in which no sulphur was present. In this case the required blowing time was 21 hours before the elastomer-containing concentrates were microscopically homogeneous with further bitumen.

Inspection data on the homogeneous blends of concentrate and unblown bitumen are given in the following Table 2.

TABLE 2

| Example | 1 | 2 | 3 |
|---|---|---|---|
| Softening point ring and ball, ° C | 46 | 49 | 52 |
| Penetration, 25° C. mm./10 | 135 | 96 | 81 |

We claim:

1. A process for the production of an asphaltic composition, which process comprises
    (1) forming a blend of:
        10–85% wt., based on the total mixture of an asphalt which is a distillation residue derived from crude petroleum,
        5–25% wt., based on the total mixture of a copolymer of one or more mono-alpha olefins and a cyclic olefin having an endocyclic bridge and at least two olefinic double bonds,
        10–85% wt., based on the total mixture of an aromatic flux oil, and
        0–4 parts by weight sulphur per 100 parts by weight of the polymer, and
    (2) blowing the blend at 150°–260° C. with a gas which contains elemental oxygen to form a concentrate, and
    (3) dissolving the concentrate in unblown asphalt.

2. A process according to claim 1 wherein the asphalt is a vacuum residue derived from a Venezuelan or Middle East crude oil.

3. A process according to claim 1 wherein the copolymer contains units derived from both ethylene and propylene.

4. A process according to claim 1 wherein the cyclic olefin is dicyclopentadiene.

5. A process according to claim 1 wherein the copolymer is present in an amount of 5–15% by weight.

6. A process according to claim 1 wherein the aromatic flux oil is an aromatic extract obtained by extraction of a lubricating oil base stock.

7. A process according to claim 1 wherein 10 to 50 parts concentrate are dissolved in 100 parts of unblown asphalt.

8. A process according to claim 7 wherein 25 parts centrate are dissolved in 100 parts of unblown asphalt.

9. A process according to claim 1 wherein the aromatic flux oil is incorporated into the copolymer by milling at a temperature in the range 90° to 150° C.

10. A process according to claim 1 wherein blowing is carried out in two stages, a first stage at 180° to 230° C. and a second stage at 230° to 250° C.

11. A process according to claim 1 wherein the concentrate is incorporated into the unblown asphalt by agitation at a temperature in the range 170° to 200° C.

12. A process according to claim 3, wherein the cyclic olefin is dicyclopentadiene.

References Cited

UNITED STATES PATENTS

| | | | |
|---|---|---|---|
| 3,669,918 | 6/1972 | Raley, Jr. | 260—28.5 A |
| 2,802,798 | 8/1957 | Smith | 260—28.5 AS |
| 2,774,724 | 12/1956 | Watson | 260—28.5 AS |
| 2,909,498 | 10/1959 | Sayko | 260—28.5 AS |
| 3,637,558 | 1/1972 | Verdol et al. | 260—28.5 AS |

ALLAN LIEBERMAN, Primary Examiner

S. L. FOX, Assistant Examiner

U.S. Cl. X.R.

260—28.5 B